United States Patent
Kanungo et al.

(10) Patent No.: US 9,643,210 B2
(45) Date of Patent: May 9, 2017

(54) FLUOROSILICONE OLEOPHOBIC LOW ADHESION ANTI-WETTING COATING

(71) Applicant: XEROX CORPORATION, Norwalk, CT (US)

(72) Inventors: Mandakini Kanungo, Penfield, NY (US); Varun Sambhy, Pittsford, NY (US); David Gervasi, Pittsford, NY (US); Santokh Badesha, Pittsford, NY (US); Matthew Kelly, West Henrietta, NY (US); Peter Michael Gulvin, Webster, NY (US)

(73) Assignee: XEROX CORPORATION, Norwalk, CT (US)

( * ) Notice: Subject to any disclaimer, the term of this patent is extended or adjusted under 35 U.S.C. 154(b) by 0 days.

(21) Appl. No.: 15/147,829

(22) Filed: May 5, 2016

(65) Prior Publication Data

US 2016/0243587 A1 Aug. 25, 2016

Related U.S. Application Data (62) Division of application No. 14/550,432, filed on Nov. 21, 2014, now Pat. No. 9,353,291.

(51) Int. Cl.

| | | |
|---|---|---|
| *B05D 5/08* | (2006.01) |
| *C09D 11/30* | (2014.01) |
| *B41J 2/165* | (2006.01) |
| *C09D 5/00* | (2006.01) |
| *C08G 18/50* | (2006.01) |
| *C08G 18/79* | (2006.01) |
| *C09D 175/04* | (2006.01) |
| *B41J 2/14* | (2006.01) |
| *C09D 183/10* | (2006.01) |
| *B41J 2/16* | (2006.01) |

(52) U.S. Cl.
CPC ............ *B05D 5/083* (2013.01); *B41J 2/1433* (2013.01); *B41J 2/165* (2013.01); *C08G 18/5015* (2013.01); *C08G 18/792* (2013.01); *C09D 5/00* (2013.01); *C09D 11/30* (2013.01); *C09D 175/04* (2013.01); *C09D 183/10* (2013.01); *B41J 2/1606* (2013.01)

(58) Field of Classification Search
None
See application file for complete search history.

(56) References Cited

U.S. PATENT DOCUMENTS

| | | | | |
|---|---|---|---|---|
| 2011/0279516 A1* | 11/2011 | Hu | ........................ | C09D 5/4484 347/21 |
| 2012/0044298 A1 | 2/2012 | Sambhy et al. |
| 2012/0154487 A1 | 6/2012 | Sambhy et al. |
| 2013/0093814 A1* | 4/2013 | Gulvin | .................. | B41J 2/1433 347/33 |
| 2013/0096254 A1 | 4/2013 | Sambhy et al. |

* cited by examiner

*Primary Examiner* — Lisa M Solomon
(74) *Attorney, Agent, or Firm* — Marger Johnson (57) ABSTRACT

An inkjet printhead includes a front face having a polymer coating, the polymer coating including an oleophobic grafted polymer having a crosslinked fluoroelastomer and a perfluorinated fluorosilicone grafted to the crosslinked fluoroelastomer. The polymer coating has an ink contact angle of at least about 45 degrees and an ink slide angle of less than about 35 degrees.

6 Claims, 4 Drawing Sheets

FLUOROSILICONE OLEOPHOBIC LOW ADHESION ANTI-WETTING COATING

CROSS-REFERENCE TO RELATED APPLICATIONS

This application is a divisional of pending U.S. patent Ser. No. 14/550,432, "FLUOROSILICONE OLEOPHOBIC LOW ADHESION ANTI-WETTING COATING;"

This application is related to the following US issued patents and patent applications:

U.S. Pat. No. 8,226,207, "COATING FOR AN INK JET PRINTHEAD FRONT FACE;"

U.S. Pat. No. 8,544,987, "THERMALLY STABLE OLEOPHOBIC LOW ADHESION COATING FOR INKJET PRINTHEAD FRONT FACE;"

U.S. Pat. No. 9,073,323, "IMPROVED PROCESS FOR THERMALLY STABLE OLEOPHOBIC LOW ADHESION COATING FOR INKJET PRINTHEAD FRONT FACE";

Copending U.S. patent Ser. No. 13/451,391, filed Apr. 19, 2012, "IMPROVED PROCESS FOR THERMALLY STABLE OLEOPHOBIC LOW ADHESION COATING FOR INKJET PRINTHEAD FRONT FACE," the disclosure of each is incorporated herein by reference in their entirety.

BACKGROUND

Embodiments disclosed here relate to coatings employed on elements of a printing apparatus. In particular, the embodiments disclosed here relate to oleophobic anti-wetting coatings employed on the front face of a printhead.

In typical solid ink printhead configurations, a printer has a nozzle plate with an array of jets through which the ink exits a jet stack. In some printhead systems, the nozzle plate and jet stacks comprise stainless steel plates, although recently these parts have been replaced with flexible, polymer layers such as polyimides. In some instances, the polyimide film receives an anti-wetting coating, bonded to a stainless steel aperture plate, and subsequently a laser ablates the array of apertures into the polyimide film.

Figure 1:
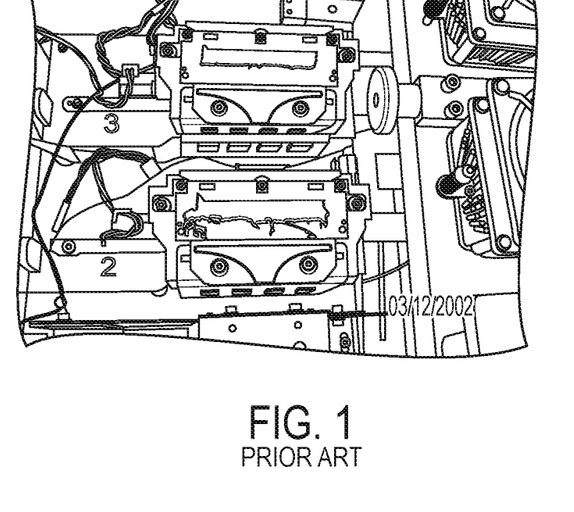
FIG. 1 shows a photograph of a contaminated printhead front face.

Drooling nozzles, wetting and adhesion of ink on the printhead front face lead to missing and misdirectional jetting along with poor image quality. Drooling nozzles weep ink when the internal pressure of the printhead exceeds a particular pressure. The higher the pressure the nozzles can maintain without weeping the better the performance. Wetting occurs when the front face of the printhead remains wet after printing. This ink that remains on the printhead can block the nozzles resulting in missing nozzles and misdirectional printing. FIG. 1 shows a photograph of such a contaminated printhead.

One approach to address these issues employs an active cleaning blade system. The system purges ink from the printhead and a wiper blade then wipes the ink off of the front face. Ink purges typically occur after the system detects missing jets and after a power-down when the ink has frozen or solidified, shrunk and drawn air into the system. The ink purge expels contamination, trapped air and clears the nozzles, and then the wipers clean off the front face.

In conjunction with wiper blade systems, various anti-wetting coatings have been used to improve performance. Current coatings, while having good thermal and ink stabilities, may suffer from lower mechanical robustness than may be desirable, especially with the demands placed on such coatings when used in conjunction with wiper blade systems. Other issues may arise due to coating stability under printhead manufacturing conditions.

DETAILED DESCRIPTION

Embodiments disclosed here provide thermally stable, mechanically robust, low adhesion coatings based on oleophobic grafted polymers prepared by grafting crosslinked fluoroelastomers with perfluorofluorosilicones. The oleophobic grafted polymers may exhibit advantageous and/or complementary chemistry relative to polyurethane based coatings. In embodiments, the oleophobic grafted polymers employed as coatings may be particularly useful in high definition (HD) piezo printhead applications where the coating is applied on the printhead front face. Coatings, or films, of the oleophobic grafted polymers disclosed here may exhibit high ink contact angles of greater than 45 degrees and low sliding angles of less than 35 degrees while having excellent thermal stability.

In addition, such coatings may also exhibit minimal thickness and mass loss after exposure to temperatures in excess of 290° C., making them suitable for use under stringent printhead fabrication conditions. Coatings employing the oleophobic grafted polymers disclosed here are robust and may have a long shelf life even when subjected to continual exposure to temperatures of about 140° C. in molten ink for 2 days. The oleophobic grafted polymer coatings can be used with solid inks, pigmented inks and UV inks, and can enable good performance under high drool pressure while demonstrating easy clean and self-cleaning properties. Finally, the oleophobic grafted polymers can be formed into the requisite coatings by simple coating techniques like flow coating, die extrusion coating, spin coating, draw bar coating, slot-die coating, facilitating printhead manufacture. These and other advantages will be apparent to those skilled in the art.

In some embodiments, the coatings consist of oleophobic grafted polymers having a fluoroelastomer crosslinked with an aminosilane cross-linker having a fluorosilicone segment fluorosilicone grafted to the crosslinked fluoroelastomer.

As used herein, the term "oleophobic" when used in conjunction with the grafted polymers, refers to the physical property of the grafted polymers to repel oils, hydrocarbons, and more generally organic compounds, especially non-polar organic compounds. Oleophobic character imparts anti-wetting properties that are useful to repel wetting by solvent-based, solid inkjet based, and other pigmented and UV curable ink compositions. The oleophobic character can provide the coatings with good contact angle and sliding angle characteristics to facilitate performance under high drool pressure.

As used here, the term "grafted polymer" refers to the chemical joining of two or more pre-fabricated polymers. Grafting can be viewed as a form of polymer crosslinking. For example, a graft polymer disclosed here may be prepared by reacting a pre-fabricated fluoroelastomer with a pre-fabricated fluorosilicone having functional group capable of covalently grafting to the fluoroelastomer. Optionally an aminosilane cross-linker can covalently link the fluoroelastomer and the fluorosilicone. In the embodiments, the crosslinker employed to crosslink the fluoroelastomer serves a dual role by providing a point of attachment for the graft chemistry to attach the fluorosilicone.

As used here, the term "fluoroelastomer" refers to any material generally classified as an elastomer and containing a substantial degree of fluorination. Fluoroelastomers are synthetic fluorine-containing rubberlike polymers, typically co-polymers/terpolymers, characterized by high thermal stability, nonflammability, and resistance to corrosive media. In embodiments, the fluoroelastomer (FE) has a fluorine content of at least about 65 percent. In the embodiments the fluorine content may be in a range from about 50 to about 90 percent, or about 60 to near 100 percent. Exemplary commercial fluoroelastomers generally have a fluorine content in a range from about 66 to about 70 percent.

Fluoroelastomers currently known and available include copolymers of vinylidene fluoride and hexafluoropropylene, terpolymers of vinylidene fluoride, hexafluoropropylene and tetrafluoroethylene, and alternating copolymers of propylene and tetrafluoroethylene. Such fluoroelastomers are available commercially as VITON™ (Dupont), DYNEON™ (3M), FLUOREL™ (3M), AFLAS™ (3M), and TECNOFLON™ (Solvay Solexis) classes of products. Such fluoroelastomers may exhibit excellent solvent and oil resistance and also have a relatively high temperature resistance compared to their non-fluorinated elastomer counterparts. In the embodiments, the fluoroelastomer (FE) may be a polymer comprising a monomer unit selected from the group consisting of vinylidene fluoride, tetrafluorethylene, hexafluoropropylene, perfluoromethylvinylether and combinations thereof. In some such embodiments, the fluoroelastomer is a terpolymer of vinylidene fluoride, tetrafluorethylene, and hexafluoropropylene.

In embodiments, the fluoroelastomer (FE) has a molecular weight in a range from about 50,000 to about 70,000 daltons as measured by gel permeation chromatography. In embodiments the fluoroelastomer may be selected based on its tensile strength. In some such embodiments, the tensile strength of the fluoroelastomer may be in a range from about 15 mPa to about 25 mPa, or about 20 to about 25 mPa, or about 22 mPa to about 25 mPa, as measured by the standard ASTM D412C. In the embodiments, the fluoroelastomer is selected particularly for its ability to participate in cross-linking chemistry as disclosed herein.

As used here, a fluorosilicone refers to a silicone polymer having a substantial degree of fluorine substitution, and may be any fluorinated oligomer, homopolymer, or copolymer. Fluorosilicones may exhibit comparable chemical stability to fluoroelastomers and may exhibit similar properties. In the embodiments, the fluorosilicone is an alkoxysilane-terminated silicone having an average molecular weight in a range from about 10 daltons to about 10,000 daltons. Fluorosilicones may be selected for their ability to bond to silanols, while having similar solvent repellent properties as the fluoroelastomers. In addition, the fluorosilicone component may be selected to confer good abrasion resistance to the oleophobic grafted polymers. Abrasion resistance is especially useful in printhead systems employing wiper blades which will continually contact the coating during use.

Limited quantities of dissimilar polymers can be incorporated into fluoroelastomers using this crosslinking methodology by capitalizing on similar functional groups in such polymers as the amine or trimethoxy functionality found in the aminosilane crosslinkers. In one embodiment, a fluoroelastomer to react with alkoxy-terminated fluorosilicones with the aminosilane to extend the sol gel formed interpenetrating network. The fluorosilicone segment usable in such a graft reaction is shown below.

Terminal alkoxysilane groups provide a chemical handle for downstream grafting chemistry, in accordance with embodiments disclosed herein. The grafting chemistry of the alkoxysilane group may be accomplished with a substrate bearing a hydroxyl group, such as an organic alcohol or a silanol. Silanol coupling partners provide access to siloxane products (Si—O—Si), such as the oleophobic grafted polymers disclosed herein. The linker (L) employed in compounds of formula II may comprise any substituted or unsubstituted $C_1$-$C_6$ alkyl, including fluorinated alkyls, such as perfluorinated alkyls. Linker L is also may also comprise any competent organic functional group to attach to the main fluorosilicone chain at a terminal oxygen, or in some embodiments, to at a terminal silicone or a terminal carbon atom. Non-limiting functional groups in linker L for attachment include silanes such as alkoxy silanes and/or chlorosilanes; silanols; carboxylic acids; amines; carbamates; esters; ethers; and the like.

The R groups of the alkoxysilane moiety ($Si(OR)_3$) may be the same or different. R may include methyl, ethyl, n-propyl, or isopropyl any of which may be substituted, including substitution with fluorine. R may also be hydrogen. In some embodiments, R is hydrogen after a hydrolysis step in preparation for grafting chemistry. In formula II, m, n, and o are integers that are selected based on the target molecular weight, as described above. In embodiments, m and o are integers from 2 to 8. In embodiments, n is an integer from 2 to 4.

In the embodiments here, the oleophobic grafted polymers disclosed may be compounds of formula I:

wherein FE is a fluoroelastomer,
FS is a fluorosilicone,
L is a linker,
m, n, and o are independently an integer from 1 to 10;

each incidence of $R^1$ and $R^2$ is independently an optionally fluorinated $C_1$-$C_6$ alkyl, $R^3$ and $R^4$ are independently an optionally fluorinated $C_1$-$C_6$ alkyl or an optionally fluorinated $C_1$-$C_6$ alkoxy. In embodiments, m and o are independently an integer from 3 to 8 and n is an integer from 1 to 10. In embodiments, the linker L comprises a $C_1$-$C_6$ alkyl terminating in a functional group capable of covalently linking to a terminal hydroxyl functionality group of the fluorosilicone, as described above.

Any $C_1$-$C_6$ alkyl or $C_1$-$C_6$ alkoxy may be straight chain or branched. In embodiments, either of these groups may be optionally substituted, including substitution with halogens other than fluorine, such as chlorine or bromine. One skilled in the art will recognize that because structure I is polymeric, not every site where the fluorosilicone is shown in structure I may actually be so substituted. Thus, in embodiments, the printhead coatings disclosed herein may comprise a mixture of structure I and structure III:

III where each of the groups are defined as set forth above. In embodiments, structure III may be a minor component and present at less than about 10 percent, or less than about 5 percent, or less than about 1 percent by weight of the coating composition. In some embodiments, compounds of structure III, where present, may have the latent silanol groups capped. For example, they may be capped as alkoxy groups by treatment with an alkylating agent.

Compounds of formula I comprise the fluoroelastomers (FE) and fluorosilicones (PFPE) described herein above. The two polymer types are brought together with the aid of a crosslinker. The crosslinker may be used to first crosslink the fluoroelastomer with itself. In embodiments, the fluoroelastomer is crosslinked with an aminofunctionalized silane. In embodiments, the aminofunctionalized silane also provides the graft attachment point for the fluorosilicone, as indicated in the structure I. In the embodiments, the aminofunctionalized silane may be based on end-capping of a polysiloxane (or just siloxane where n=1 in structures I and III) with 3-aminopropyl trimethoxy silane (AO800, available from UCT, Bristol, Pa.). One skilled in the art will appreciate that the crosslinking agent may itself include a high degree of fluorination, although this is not necessary.

Some embodiments provide processes for making an oleophobic grafted polymer comprising crosslinking a fluoroelastomer with an aminofunctionalized silane and grafting an alkoxysilane-terminated fluorosilicone to the crosslinked fluoroelastomer. In some such embodiments, the oleophobic grafted polymer accessed by such a process may comprise the compound of structure I, described above. In the embodiments, the crosslinking may be performed in the presence of the alkoxysilane-terminated fluorosilicone. It is expected that the crosslinking of fluoroelastomer comprising hydrogen atoms in the backbone may allow the fluoroelastomer to be dehydrofluorinated as indicated in Step 1 of reaction Scheme 1 below. Dehydrofluorination provides an unsaturated fluoroelastomer intermediate and a protonated aminofunctionalized crosslinker. Regeneration of the amine with base (Step 2) and subsequent amine addition across the unsaturation (Step 3) provides a crosslinked fluoroelastomer which is ready to be grafted with the perfluorinated fluorosilicone. The grafting (Step 4) may be accomplished by hydrolyzing the alkoxy groups of the alkoxysilanes on the crosslinker and/or the alkoxysilane terminated fluorosilicone to provide the compounds of structure I.

Step 1: (Dehydrofluorination)

Step 2: (Regeneration of Amine)

Step 3: (Addition of Amine Across the Double Bond)

crosslinked
fluoroelastomer

Scheme 1: Crosslinking Reaction of a Fluoroelastomer with an Alkoxysilane Terminated Perfluorinated Fluorosilicone Using an Aminofunctionalized Fluorosilicone as a Crosslinker.

As described above, the fluoroelastomer crosslinking may be carried out in the presence of the perfluorinated fluorosilicone. In some such embodiments, a ratio of the aminofunctionalized silane to the alkoxysilane-terminated perfluorinated fluorosilicone is in a range from about 0.5:1 to about 3:1, or about 1:1 to about 2:1. In some embodiments, the ratio may be about 1.5:1. In some embodiments, an amount of the aminofunctionalized silane relative to the fluoroelastomer is in a range from about 2 pph to about 10 pph. In some embodiments, the attachment of the aminofunctionalized crosslinker with the perfluorinated fluorosilicone may be carried out before the crosslinking of the fluoroelastomer. Any of the processes describe above may be carried out with the aid of a catalyst and reactions may be optionally carried out at elevated temperatures. Typically, the reactions will be run in an organic solvent, such as methyl isobutyl ketone (MIBK). In the embodiments, the reactions are all run in a one-pot sequence without isolation of chemical intermediates. In embodiments, the reaction products is used directly to form a coating with or with out any type of purification.

In some embodiments, there are provided inkjet printheads comprising a front face having a polymer coating, the polymer coating comprising an oleophobic grafted polymer comprising a crosslinked fluoroelastomer and a fluorosilicone grafted to the crosslinked fluoroelastomer. In some such embodiments, oleophobic grafted polymer comprises the compound of structure I.

Modeling has shown that the ink contact angle for competent oleophobic coating should be greater than about 40 degrees over lifespan of the coating to maintain a drool pressure specification of about 4 inches, with a higher contact angle being more beneficial. The front face coating ideally also has a low slide angle to enable the easy/self clean feature, which will lead to a printhead cartridge with no or low maintenance, high engine reliability and low run cost. Low slide angle is a measure of low ink adhesion and indicates that ink can be wiped off cleanly from the surface without leaving ink residue around the nozzle. Any ink residue around the nozzle area can break the ink meniscus and lead to drooling at pressure below the spec value. Also any coatings ideally maintain these properties after harsh fabrication conditions of the stacking press such as about 290° C. at 350 PSI for 30 min. In some embodiments, the polymer coating has an ink contact angle of at least about 50 degrees and an ink slide angle of less than about 30 degrees. Furthermore, the polymer coating employed on the printhead front face may be characterized by being stable at 290° C. at 350 psi to facilitate manufacture.

The oleophobic low adhesion surface coating disclosed here can be employed as an anti-wetting printhead front face coating for an inkjet printhead configured to eject ink onto a recording substrate. Any suitable recording substrate may be employed, including plain papers such as XEROX® 4024 papers, XEROX® Image Series papers, Courtland 4024 DP paper, ruled notebook paper, bond paper, silica coated papers such as Sharp Company silica coated paper, JuJo paper, Hammermill Laserprint Paper, and the like, transparency materials, fabrics, textile products, plastics, polymeric films, inorganic substrates such as metals and wood, and the like.

In some embodiments, the printhead comprises a front face with a surface having an oleophobic low adhesion coating comprising an oleophobic low adhesion polymeric material wherein jetted drops of ultra-violet gel ink or jetted drops of solid ink exhibit a contact angle with the surface coating that is greater than about 50 degrees. In some embodiments, the contact angle is greater than about 55, or greater than about 65 degrees. In one embodiment, there is no upper limit to the contact angle exhibited between the jetted drops of ultra-violet gel ink or jetted drops of solid ink and the surface coating. In another embodiment, the contact angle is less than about 150 degrees, or less than about 90 degrees. The greater the ink contact angle, the higher the drool pressure. Drool pressure relates to the ability of the aperture plate to avoid ink weeping out of the nozzle when the pressure of the ink tank (reservoir) increases. In some embodiments, the coatings provide, in combination, low adhesion and high contact angle for ultra-violet curable gel ink and solid ink which advantageously affects the drool pressure. In some embodiments, the coatings herein provide a low sliding angle of less than about 30 degrees. In some embodiments, the sliding angle is less than about 25 degrees. In some embodiments, the sliding angle is greater than about 1 degree. Contact angle is largely insensitive to drop size. However, contact angle can be measured upon disposing 5-10 microliter drops of UV ink or solid ink onto the surface coating. Sliding angle can be measured upon disposing 7-12 microliter drops of UV ink or solid ink onto the surface coating.

In the embodiments described here, the oleophobic low adhesion coatings are thermally stable, thereby providing a low sliding angle in a range from about 1 degree and about 30 degrees and a high contact angle in a range from about 45 degrees and about 150 degrees even after exposure to high temperatures, such as temperatures in a range from about 180° C. and about 325° C., and high pressures, in a range from about 100 psi and about 400 psi, for 15 extended periods of time such as periods of time in a range from about 10 minutes and about 2 hours. In one embodiment, the oleophobic low adhesion coating is thermally stable after being exposed to a temperature of about 290° C. at pressures of about 350 psi for about 30 minutes. The fabrication of high density Piezo printheads requires a high temperature, high pressure adhesive bonding step. It would be desirable for a frontface coating to withstand these high temperature and high pressure conditions. The stability of the oleophobic low adhesion surface coating described here at high temperatures and high pressures is compatible with current printhead manufacturing processes.

When coated onto the front face of an inkjet printhead, the oleophobic low adhesion surface coating exhibits a sufficiently low adhesion with respect to the inks that are ejected from the inkjet printhead such that ink droplets remaining on the oleophobic low adhesion coating can slide off the printhead in a simple, self-cleaning manner. Contaminants such as dust, paper particles, etc., which are sometimes found on the front face of inkjet printheads, can be carried away from the inkjet printhead front face by a sliding ink droplet. The oleophobic low adhesion printhead front face coating can provide a self-cleaning, contamination-free inkjet printhead.

As used herein, the oleophobic low adhesion coating can exhibit a "sufficiently low wettability" with respect to inks that are ejected from an inkjet printhead when a contact angle between an ink and the oleophobic low adhesion coating is, in one embodiment, greater than about 50 degrees, or greater than about 55 degrees.

The oleophobic low adhesion coating disclosed herein can be employed as an oleophobic low adhesion printhead front face coating for an inkjet printhead of any suitable inkjet printer such as continuous inkjet printers, thermal drop-on-demand (DOD) inkjet printers, and piezoelectric DOD inkjet printers. As used here, the term "printer" encompasses any apparatus, such as a digital copier, bookmaking machine, facsimile machine, multi-function machine, and the like, which performs a print outputting function for any purpose.

The oleophobic low adhesion coating disclosed here can be employed as an oleophobic low adhesion printhead front face coating for an inkjet printhead configured to eject any suitable ink such as aqueous inks, solvent inks, UV-curable inks, dye sublimation inks, solid inks, etc. An exemplary inkjet printhead suitable for use with the oleophobic low adhesion coating disclosed herein is described with respect to FIG. 2.

Figure 2:
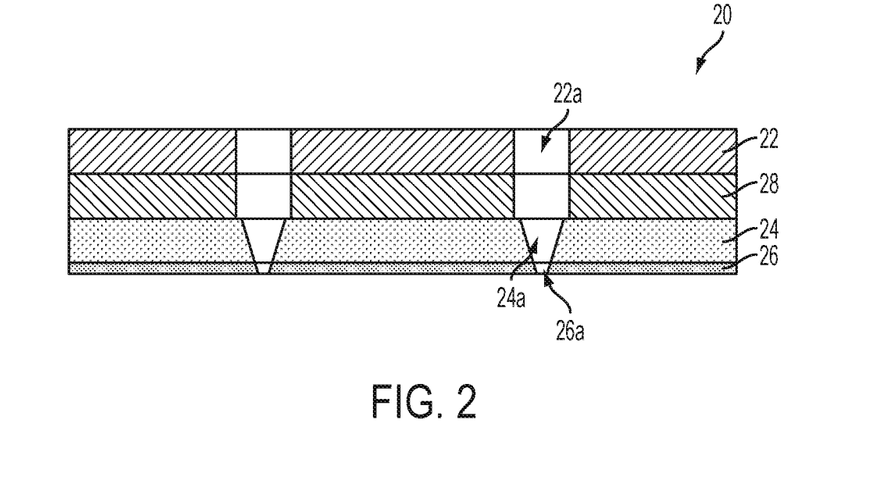
FIG. 2 shows a side view of printhead assembly.

Referring to FIG. 2, an inkjet printhead 20 according to one embodiment of the 5 present invention includes a support brace 22, a nozzle plate 24 bonded to the support brace 22 and an oleophobic low adhesion coating, such as oleophobic low adhesion coating 26.

The support brace 22 is formed of any suitable material such as stainless steel and include apertures 22a defined therein. The apertures 22a may communicate with an ink source (not shown). The nozzle plate 24 may be formed of any suitable material such as polyimide and include nozzles 24a defined therein. The nozzles 24a may communicate with the ink source via the apertures 22a such that ink from the ink source is jettable from the printhead 20 onto a recording substrate through a nozzle 24a.

In the illustrated embodiment, the nozzle plate 24 is bonded to the support brace 22 by an intervening adhesive material 28. The adhesive material 28 may be provided as a thermoplastic adhesive can be melted during a bonding process to bond the nozzle plate 24 to the support brace 22. Typically, the nozzle plate 24 and the oleophobic low adhesion coating 26 are also heated during the bonding process. Depending on the material from which the thermoplastic adhesive is formed, bonding temperature can be in a range from about 180° C. and about 325° C.

Conventional oleophobic low adhesion coatings tend to degrade when exposed to temperatures encountered during typical bonding processes or other high-temperature, high pressure processes encountered during fabrication of inkjet printheads. However, the oleophobic low adhesion coating 26 disclosed herein exhibits a sufficiently low adhesion, indicated by low sliding angles, and high contact angle with respect to an ink after it has been heated to the bonding temperature. The oleophobic low adhesion coating 26 can provide a self-cleaning, contamination-free inkjet printhead 20 with high drool pressure. The ability of the oleophobic low adhesion coating 26 to resist substantial degradation in desirable surface properties, including low sliding angle and high contact angle, upon exposure to elevated temperatures enables inkjet printheads having self-cleaning abilities while maintaining high drool pressure, to be fabricated using high temperature and high pressure processes. An embodiment of a process of forming an inkjet 10 printhead is described with respect to FIGS. 2-5.

Figure 3:
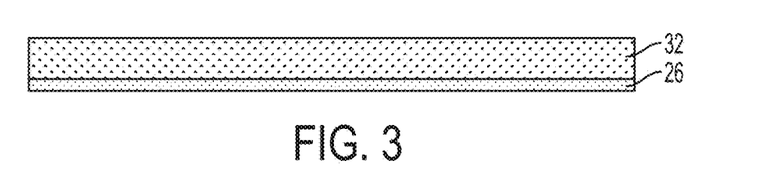
FIG. 3 shows a side view of an intermediate structure in a process for preparing the printhead assembly of FIG. 2, in accordance with embodiments disclosed herein.

Referring to FIG. 3, an inkjet printhead, such as the inkjet printhead 20, may be formed by forming an oleophobic low adhesion coating, such as oleophobic low adhesion coating 26 on a substrate 32. The substrate 32 may be formed of any suitable material such as polyimide.

In one embodiment, the oleophobic low adhesion coating 26 may be formed on the substrate 32 by initially applying the reactant mixture that, as described above, includes at least one fluoroelastomer and at least one fluorosilicone compound. After the reactant mixture is applied to the substrate 32, the reactants are reacted together to form the oleophobic low adhesion coating 26. The reactants can be reacted together by, for example, curing the reactant mixture In one embodiment, the reactant mixture may be applied to the substrate 32 using any suitable method such as die extrusion coating, dip coating, spray coating, spin coating, flow coating, stamp printing, and blade techniques. An air atomization device such as an air brush or an automated air/liquid spray can be used to spray the reactant mixture. The air atomization device can be mounted on an automated reciprocator that moves in a uniform pattern to cover the surface of the substrate 32 with a uniform amount of the reactant mixture. The use of a doctor blade is another technique that can be employed to apply the reactant mixture. In flow coating, a programmable dispenser is used to apply the reactant mixture.

Figure 4:
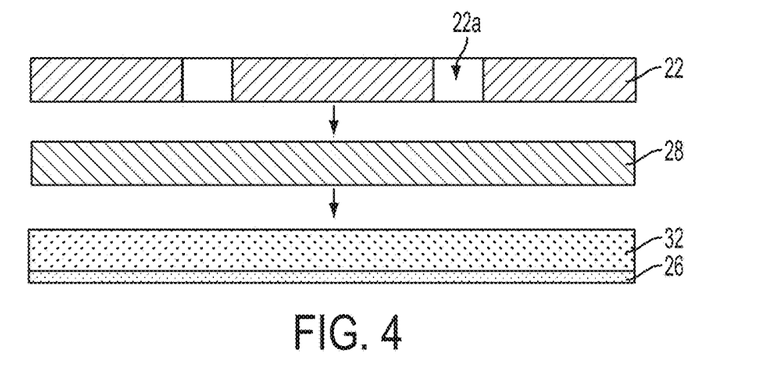
FIG. 4 shows a side view of another intermediate structure in a process for preparing the printhead assembly of FIG. 2, in accordance with embodiments disclosed herein.
Figure 5:
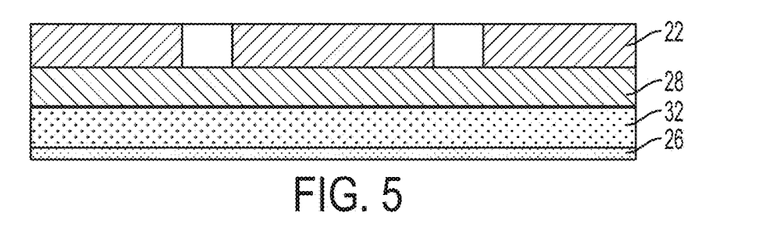
FIG. 5 shows a side view of yet another intermediate structure in a process for preparing the printhead assembly of FIG. 2, in accordance with embodiments disclosed herein.

Referring to FIG. 4, the substrate 32 is bonded to the aperture brace 22 via adhesive material 28, resulting in the structure shown in FIG. 5. In one embodiment, the adhesive material 28 is bonded to the aperture brace 22 before being bonded to the substrate 32. In another embodiment, the adhesive material 28 is bonded to the substrate 32 before being bonded to the aperture brace 22. In yet another embodiment, the adhesive material 28 is bonded to the substrate 32 and the aperture brace 22 simultaneously.

In embodiments where the adhesive material 28 is provided as a thermoplastic adhesive, the adhesive material 28 is bonded to the substrate 32 and the aperture brace 22 by melting the thermoplastic adhesive at, and subjecting the oleophobic low adhesion 20 coating 26 to, a bonding temperature and a bonding pressure. In one embodiment, the bonding temperature is at least about 290° C. In one embodiment, the bonding temperature can be at least about 310° C. In another embodiment, the bonding temperature can be at least about 325° C. In one embodiment, the bonding pressure is at least about 100 psi. In one embodiment, the bonding pressure can be at least about 300 psi.

After bonding the substrate 32 to the aperture brace 22, the aperture brace 22 may be used as a mask during one or more patterning processes to extend the apertures 22a into the adhesive material 28, as shown in FIG. 2. The aperture brace 22 may also be used as a mask during one or more patterning processes to form nozzles 24a in the substrate 32, thereby forming the nozzle plate 24 shown in FIG. 2. The one or more patterning processes used to form nozzles 24a may also be applied to form nozzle openings 26a within the oleophobic low adhesion coating 26, wherein the nozzle openings 26a communicate with the nozzles 24a. In one embodiment, the apertures 22a may be extended into the adhesive material 28 by a laser ablation patterning process, or the like. In one embodiment, the nozzles 24a and nozzle openings 26a may be formed in the substrate 32 and the oleophobic low adhesion coating 26, respectively, by a laser ablation patterning process, or the like.

EXAMPLES

Synthesis of an Oleophobic Grafted Polymer (A)

Figure 6:
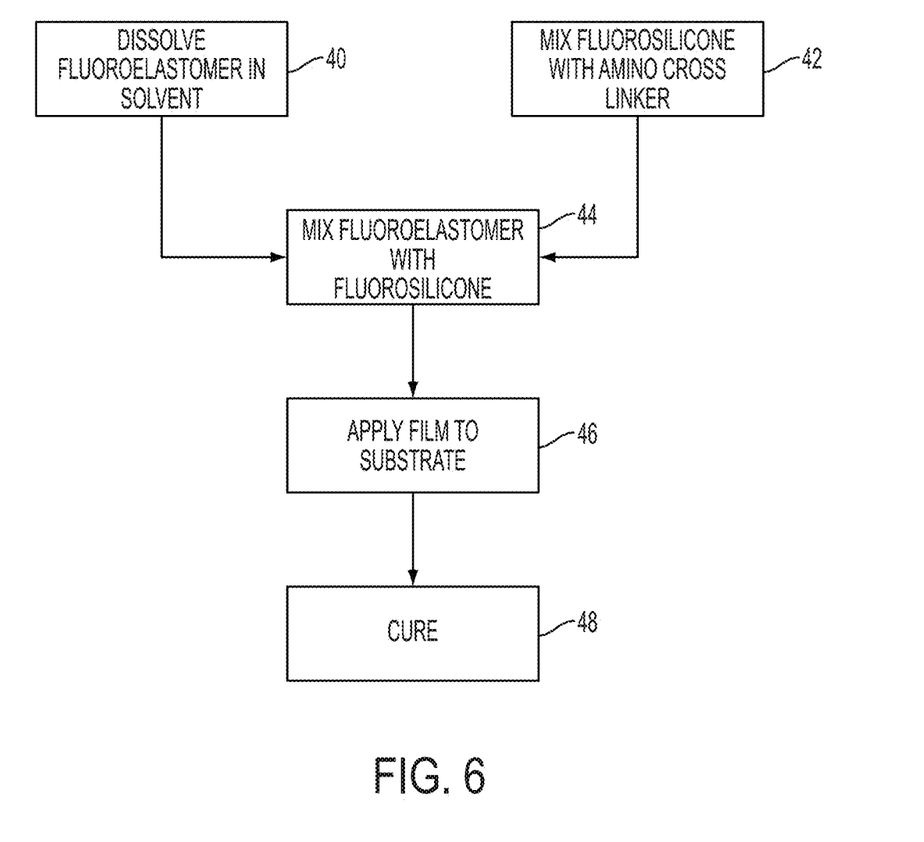
FIG. 6 shows a synthetic procedure for making grafts.

With reference to FIG. 6, a fluoroelastomer is dissolved into a ketone solvent at 40 (Part A) and will be referred to as the fluoroelastomer. Meanwhile, an alkoxysilane terminated fluorosilicone with an amino cross linker (Part B) is tumbled overnight at 42 and will be referred to here as the fluorosiloxane. After both of these solutions are prepared, the fluorosiloxane is added gradually to the fluoroelastomer followed by a catalyst at 44. In one embodiment, the catalyst is MgO/CaO. This mixture was then tumbled for 2 hours and applied to a polymer substrate used as the front face of a printhead at 46. In one embodiment, the coating is drawbar coated onto polyimide. The coating may also be applied by flow coating. Upon evaporation of the solvent, the polymer film is oven cured at 48 such as at an elevated temperature up to 450° F. for up to 24 hours. The curing process may involve other curing conditions as well.

In a specific embodiment of this process, a 17.5% solution of a fluoroelastomer (TECNOFLON® FKM (P 959), Solvay Specialty Polymers, Alpharetta, Ga.) was made by dissolving in methyl isobutyl ketone (MIBK) and about 1 pph by weight FC4430 (3M) and AKF 290 (Wacker). It is believed that the surfactant may impart compatibility between the fluoroelastomer and the release layer/oil applied on fuser and it prevents pin holes/fish eye defect. Next, an amino crosslinker and an alkoxysilane terminated fluorosilicone with a mole ratio of 1.5:1 in MIBK were mixed and rolled overnight. In this Example, three different formulations were tried with (1) crosslinker:and fluorosilicone (0.86 mM:0.57 mM) (2) crosslinker:and fluorosilicone (1.71 mM:1.13 mM) (3) crosslinker:and fluorosilicone (2.56 mM:1.70 mM. After 16-18 h, Part B was added into Part A dropwise, as the mixing at 44. Once the addition of Part B to Part A was done, a catalyst solution such as MgO/CaO 9% stock solution in MIBK mixture in the sol was added and the mixture shaked vigorously for five minutes using a devil shaker and the resulting mixture was draw bar coated on a polyimide substrate for surface property measurement. Those were cured at room temperature for overnight and transferred to an oven which was kept at 218° C. for 4 hours.

Figure 7:
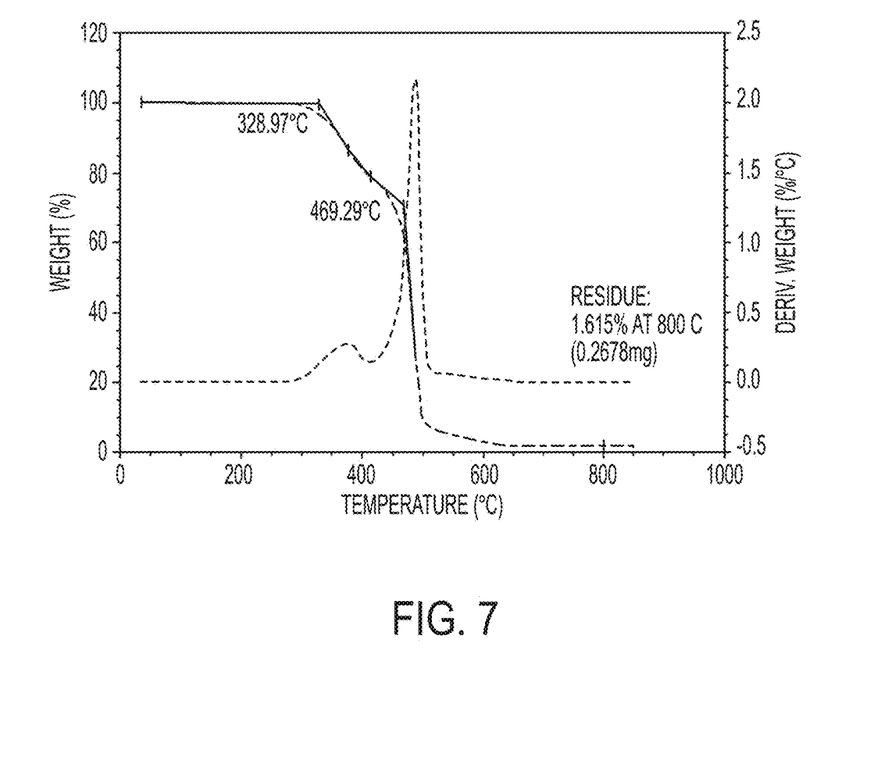
FIG. 7 shows a thermogravimetric analysis (TGA) profile of an exemplary oleophobic grafted polymer, in accordance with embodiments disclosed herein. The TGA analysis indicates that the coating is thermally stable up to about 330° C. without weight loss.

Characterization of the Oleophobic Grafted Polymer:

A TGA decomposition profile in air shows the coatings are stable until 330° C. as shown in FIG. 7. Coatings were evaluated for surface properties towards ink. Results are shown in Table 1 below.

TABLE 1

| Coating | Thickness and Mass loss after exposure to 290° C. for 30 min | Surface properties Contact Angle, CA and sliding angle (SA) (degree) towards solid ink | | |
|---|---|---|---|---|
| | | Initial (after curing) | Stacking (290° C./ 350 PSI/ 30 min) | Stacking + 2 day inking at 140° C. |
| Fluoroelastomer-fluorosilicone graft | 3-5% | 68 (18-20) | 68 (31) | 67 (25) |
| Current coatings | Approx.. 50% | 71 (10) | 68 (15) | 60 (20) |

As can be seen, the surface properties are comparable to the current control coating. These coatings maintained high contact angles after stacking conditions, 290° C./350 PSI with Teflon coverlay, which simulates press adhesive bonding cycles employed during printhead fabrication. Also stacked coatings maintained high contact angle after 2 days at 140° C. with molten CYMK ink. The sliding angles were somewhat higher than a control, but the ink slid cleanly from the surface and it is believed to be sufficiently low to enable easy cleaning in use. In addition, this exemplary oleophobic grafted polymer is expected to have the mechanical robustness desired for the long term performance of these coatings. These coatings can be scaled up through flow coating procedures and the demonstration of the flow coating using these grafted polymers has been accomplished.

The TGA decomposition profile in air shows the coatings are stable until 300° C. The coatings were evaluated for surface properties and the results shown in Table 1 below. These coatings maintained contact angle after stacking conditions at 290° C. and 350 PSI with a Teflon® coverlay, which simulate press adhesive bonding cycles of printhead fabrication. Also, stacked coatings maintained high contact angle even after 2 days of immersion in 140° C. molten solid ink. The sliding angles are somewhat high when compared to current coatings, but are still easy to clean. When test coupons were pulled from the ink soaked studies the ink came cleanly off and no ink residue was observed in the coatings.

The fluoroelastomer-fluorosilicone graft coatings are thermally stable, mechanically robust, oleophobic low adhesion coatings. These formulations have a much different chemistry from the other coatings used in this area. These coatings have high ink contact angle and a low sliding angle while having thermal stability. No oil is observed on the surface of these films after curing. These coatings also show very little thickness and mass loss after 290° C. temperature exposure.

The fact that these coatings show no oil and have very high thermal stability while maintaining the desired surface properties makes them attractive options for anti-wetting coatings for high definition piezo print applications.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A process for making an oleophobic grafted polymer coating on a printhead comprising:
   crosslinking a fluoroelastomer with an aminofunctionalized silane;
   grafting an alkoxysilane-terminated fluorosilicone to the crosslinked fluoroelastomer to form a oleophobic grafted polymer; and
   coating the oleophobic grafted polymer on a printhead front face.

2. The process of claim 1, wherein the oleophobic grafted polymer has a final structure of formula I:

wherein FE is a fluoroelastomer;
FS is a perfluorinated fluorosilicone;
L is a linker;
m, n, and o are independently an integer from 1 to 10
each incidence of $R^1$ and $R^2$ is independently an optionally fluorinated $C_1$-$C_6$ alkyl,
$R^3$ and $R^4$ are independently an optionally fluorinated $C_1$-$C_6$ alkyl or an optionally fluorinated $C_1$-$C_6$ alkoxy.

3. The process of claim 1, wherein the crosslinking step is performed in the presence of the alkoxysilane-terminated fluorosilicone.

4. The process of claim 1, wherein a ratio of the aminofunctionalized silane to the alkoxysilane-terminated fluorosilicone is in a range from about 0.5:1 to about 3:1.

5. The process of claim 1, wherein an amount of the aminofunctionalized silane relative to the fluoroelastomer is in a range from about 2 pph to about 10 pph.

6. An inkjet printhead comprising a front face having a polymer coating, the polymer coating comprising a structure of formula I:

wherein FE is a fluoroelastomer;
FS is a fluorosilicone;
L is a linker;
m, and o are independently an integer from 3 to 8;
n is an integer from 1 to 10;
each incidence of $R^1$ and $R^2$ is independently a substituted or unsubstituted $C_1$-$C_6$ alkyl,
$R^3$ and $R^4$ are independently an optionally fluorinated $C_1$-$C_6$ alkyl or an optionally fluorinated $C_1$-$C_6$ alkoxy.

* * * * *